US008688040B2

(12) United States Patent
Jung

(10) Patent No.: US 8,688,040 B2
(45) Date of Patent: Apr. 1, 2014

(54) BLUETOOTH HEADSET FOR HELMET HAVING INTER-COMMUNICATION FUNCTION

(75) Inventor: Ohjin Jung, Seoul (KR)

(73) Assignee: Sena Technologies Inc., Seoul (KR)

( * ) Notice: Subject to any disclaimer, the term of this patent is extended or adjusted under 35 U.S.C. 154(b) by 271 days.

(21) Appl. No.: 12/971,537

(22) Filed: Dec. 17, 2010

(65) Prior Publication Data

US 2012/0077438 A1 Mar. 29, 2012

(30) Foreign Application Priority Data

Sep. 29, 2010 (KR) ........................ 10-2010-0094735

(51) Int. Cl.
*H04B 7/00* (2006.01)
*H04M 1/00* (2006.01)

(52) U.S. Cl.
USPC ....................................... 455/41.2; 455/575.2

(58) Field of Classification Search
USPC .................................. 455/41.2, 457.2, 575.2
See application file for complete search history.

(56) References Cited

U.S. PATENT DOCUMENTS 8,233,947 B2 * 7/2012 Kushnirov ................. 455/575.2
2007/0254709 A1 * 11/2007 Higgins ........................ 455/557
2008/0144854 A1 * 6/2008 Abreu ............................ 381/74
2008/0207281 A1 * 8/2008 Tsuchiya et al. ........... 455/575.1
2010/0048134 A1 * 2/2010 McCarthy et al. ........... 455/41.3
2010/0118158 A1 * 5/2010 Boland et al. .............. 348/211.2
2010/0166207 A1 * 7/2010 Masuyama ..................... 381/74
2010/0166208 A1 7/2010 Kato
2011/0235818 A1 * 9/2011 Cozens et al. .................. 381/74

FOREIGN PATENT DOCUMENTS

| | | |
|---|---|---|
| JP | 2003-082520 | 3/2003 |
| JP | 2005-328118 | 11/2005 |
| JP | 3142369 | 6/2008 |
| JP | 2010-157896 | 7/2010 |
| JP | 3163344 | 10/2010 |
| KR | 10-2007-0002114 | 1/2007 |
| WO | 2009-131588 | 10/2009 |

OTHER PUBLICATIONS

"Bluetooth® Stereo Headset and Intercom for Motorcycles, SMH10," published in Marketwire on Jan. 4, 2010.

* cited by examiner

*Primary Examiner* — Andrew Wendell
*Assistant Examiner* — Maryam Soltanzadeh
(74) *Attorney, Agent, or Firm* — NSIP Law

(57) ABSTRACT

A Bluetooth headset for a helmet having an inter-communication is provided. The Bluetooth headset includes a headset body configured to be mounted on a helmet, a microphone and a speaker that are configured to be installed on the headset body, a jog dial configured to be installed to perform a rotation operation and be subject to a push operation, a Bluetooth module configured to be accommodated in the headset body and to perform wireless communication while paired with an external Bluetooth device, and a control unit configured to be accommodated in the headset body to process a signal input from the microphone, a signal input according to the rotation operation and the push operation of the jog dial and a signal received from the Bluetooth module and output the processed signal to the speaker and the Bluetooth module.

6 Claims, 5 Drawing Sheets

BLUETOOTH HEADSET FOR HELMET HAVING INTER-COMMUNICATION FUNCTION

CROSS-REFERENCE TO RELATED APPLICATION

This application claims the benefit under 35 U.S.C. §119(a) of Korean Patent Application No. 10-2010-0094735, filed on Sep. 29, 2010, the disclosure of which is incorporated by reference in its entirety for all purposes.

BACKGROUND

1. Field

The following description relates to a Bluetooth headset mounted on a helmet, and more particularly, to a Bluetooth headset allowing a driver to have a hands free call service and enjoy music.

2. Description of the Related Art

A helmet is used to protect the head or face of a driver when driving a two-wheeled vehicle such as a motorcycle or a bicycle. It is compulsory for a driver to wear a helmet while driving a motorcycle and it is also recommended to wear on a helmet while riding a bicycle for the safety of a driver.

However, due to the inconvenience of using a mobile phone while wearing a helmet, a driver may use a mobile phone only after taking off the helmet. In addition, a driver has limited use of both hands while driving, and the user must stop driving to receive a call on a mobile phone.

In order to solve such inconveniences, a Bluetooth headset may be mounted on a helmet. Bluetooth is a wireless transmission technology and allows voice and data communication between Bluetooth devices. The Bluetooth headset has a Bluetooth function, so that a driver can talk on a mobile phone having a Bluetooth function while wearing the helmet and talk on the mobile phone with no hands by use of the Bluetooth headset. In addition, a driver may enjoy music that is played through an audio device having a Bluetooth function. The Bluetooth headset is provided with a plurality of input buttons, for example, power on/off buttons, call start/end buttons, and volume up/down buttons.

However, such input buttons are small and individually provided on the Bluetooth headset, so the driver wearing the helmet has to fumble around the helmet for a desired button, thereby increasing the time required to find the desired button. In this process, the user may erroneously push an unwanted button. In particular, a driver having thick gloves on has more difficulty in finding a desired button and has a higher possibility of pushing an unwanted button, thereby causing an inconvenience.

SUMMARY

In one aspect, there is provided a Bluetooth headset for a helmet having an inter-communication function, capable of allowing a driver to input a desired instruction in a rapid and precise manner while wearing a helmet.

In one general aspect, there is provided a Bluetooth headset for a helmet having an inter-communication. The Bluetooth headset includes a headset body, a microphone and a speaker, a jog dial, a Bluetooth module and a control unit. The headset body is configured to be mounted on a helmet. The microphone and the speaker are configured to be installed on the headset body. The jog dial is configured to be installed to perform a rotation operation and be subject to a push operation. The Bluetooth module is configured to be accommodated in the headset body and to perform wireless communication while paired with an external Bluetooth device. The control unit is configured to be accommodated in the headset body to process a signal input from the microphone, a signal input according to the rotation operation and the push operation of the jog dial and a signal received from the Bluetooth module and to output the processed signal to the speaker and the Bluetooth module.

According to the present invention, various types of instructions are input to a Bluetooth headset through one jog dial. The time required to find a desired jog dial is shorter than the time required to find small individual buttons for inputting various types of instructions and thus the precision of inputting a desired instruction is more improved compared to the conventional Bluethooth headset, in particular, when a user wears thick gloves.

Other features will become apparent to those skilled in the art from the following detailed description, which, taken in conjunction with the attached drawings, discloses exemplary embodiments of the invention.

BRIEF DESCRIPTION OF THE DRAWINGS

Elements, features, and structures are denoted by the same reference numerals throughout the drawings and the detailed description, and the size and proportions of some elements may be exaggerated in the drawings for clarity and convenience.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

Hereinafter, examples will be described with reference to accompanying drawings in detail.

Figure 1:
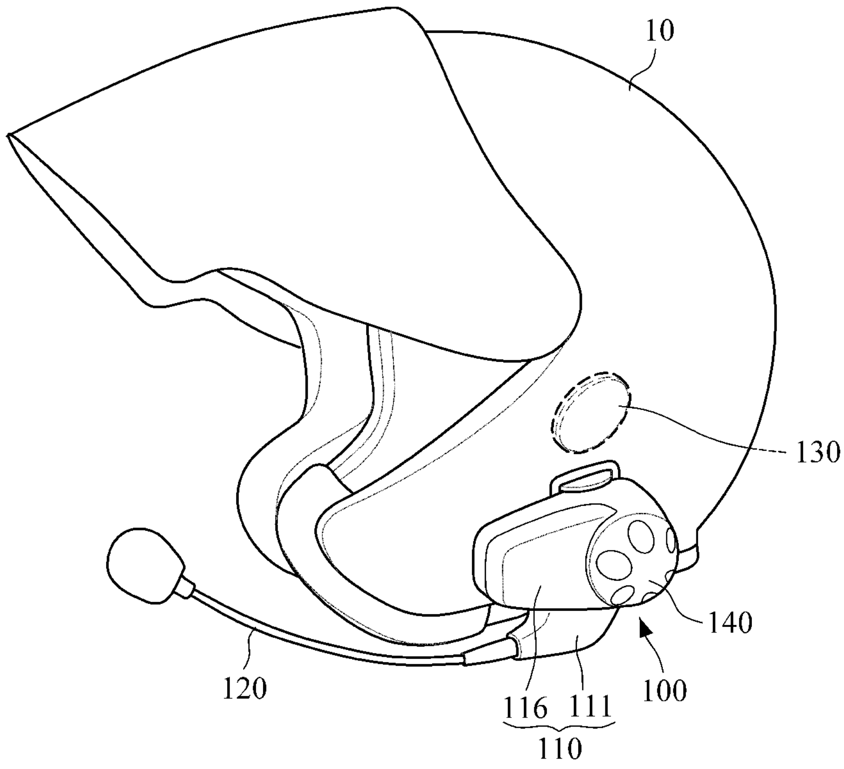
FIG. 1 is a perspective view illustrating an example of a Bluetooth headset for a helmet having an inter-communication function, the Bluetooth headset mounted on a helmet.

FIG. 1 is a perspective view illustrating an example of a Bluetooth headset for a helmet having an inter-communication (intercom) function, the Bluetooth headset mounted on a helmet.

Figure 2:
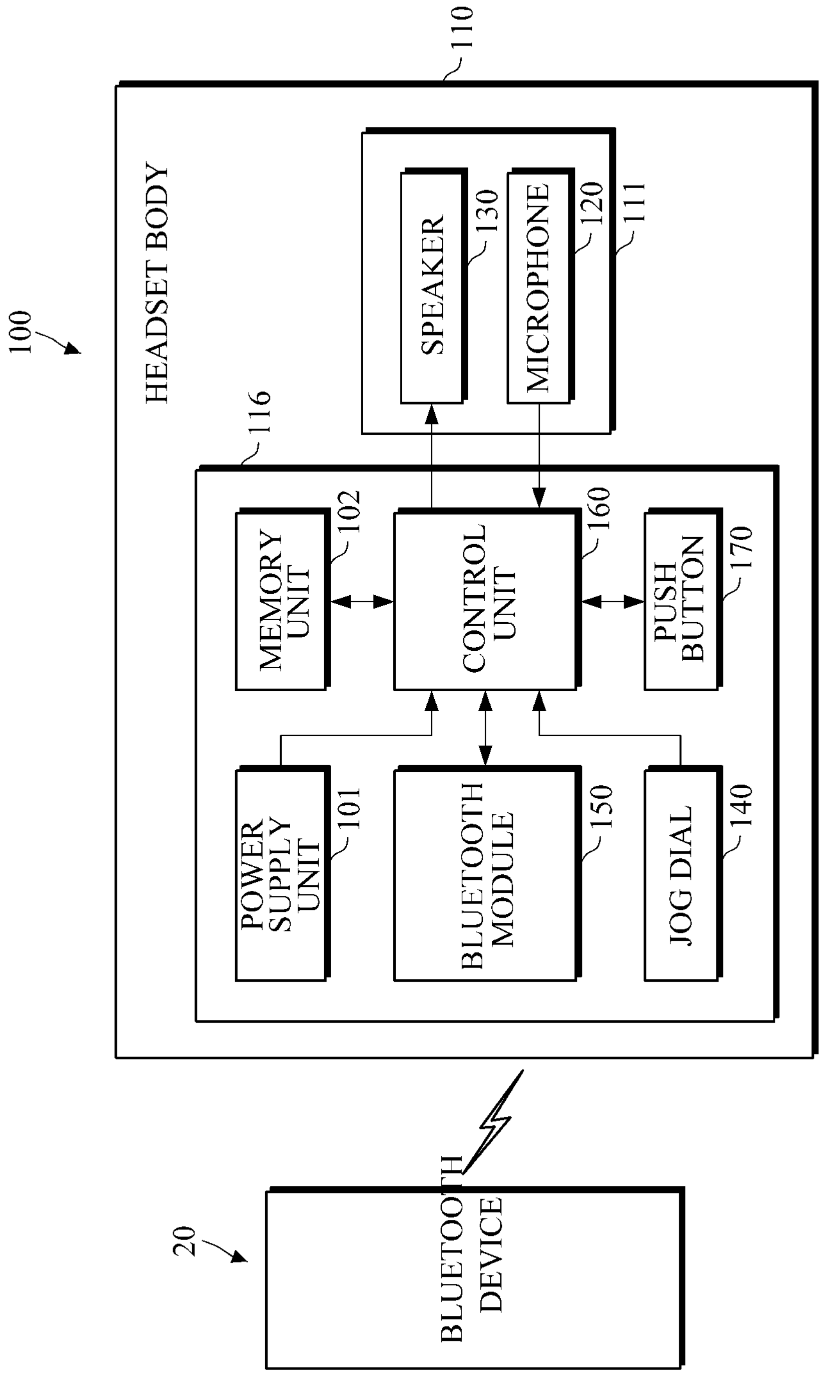
FIG. 2 is a block diagram illustrating an example of the Bluetooth headset.

FIG. 2 is a block diagram illustrating an example of the Bluetooth headset.

As shown in FIGS. 1 and 2, a Bluetooth headset 100 is mounted on a helmet 10 to enable a driver to have a call over a mobile phone with no hands, enjoy music played from an audio device, hear voice guide information from a navigation system or have a wireless intercom call even while the driver is wearing the helmet 10.

The Bluetooth headset 100 includes a headset body 110, a microphone 120, a speaker 130, a jog dial 140, a Bluetooth module 150 and a control unit 160. The headset body 110 is mounted on the helmet 10 such that the Bluetooth headset 100 is supported by the helmet 10. The helmet 10 may be a helmet for motocycles or a helmet for bicycles.

The microphone 120 and the speaker 130 are installed on the headset body 110. The microphone 120 receives speech of a driver to transfer the received speech to the control unit 160. The speaker 130 transfers a speech signal received from the control unit 160 to the driver.

The jog dial 140 is installed on the headset body 110 to perform a rotation operation and be subject to a push operation. The rotation operation of the jog dial 140 may provide a wide range of applications. For example, as the jog dial 140 rotates, volume up/down instructions may be input to the control unit 160 according the direction of rotation of the jog dial 140. Also, the push operation of the jog dial 140 may provide a wide range of applications. For example, as the jog dial 140 is pushed, call on/off instructions, call start/end instructions, or music play/stop instructions may be input to the control unit 160.

The Bluetooth module 150 is accommodated in the headset body 110. The Bluetooth module 150 performs wireless communication, while being paired mode with an external Bluetooth device 20. The Bluetooth module 150 enables voice communication and data communication between the Bluetooth headset 100 and the Bluetooth device 20. The Bluetooth device 20 may be implemented by a mobile phone, an audio device such as an MP3 player, a navigation system and other Bluetooth headsets capable of performing an intercom call.

The control unit 160 is accommodated in the headset body 110. The control unit 160 processes a signal input from the microphone 120, a signal input according to the rotation operation and the push operation of the jog dial 140 and a signal received from the Bluetooth module 150 and outputs the processed signal to the speaker 130 and the Bluetooth module 150. The control unit 160 receives power from a power supply unit 101. The control unit 160 may write data to the memory 102 or read data from the memory 102.

As described above, volume up/down instructions, music play/stop instructions, call on/off instructions or call start/end instructions may be input to the Bluetooth headset through only one jog dial. Accordingly, compared to the conventional Bluetooth headset, in which small individual buttons need to be found to input instructions, the Bluetooth headset according to the present invention enables a user to rapidly find a jog dial for inputting various types of instructions and a desired instruction to be precisely input. In particular, the present invention provides more manipulation efficiency in the case where a driver wears thick gloves.

Figure 3:
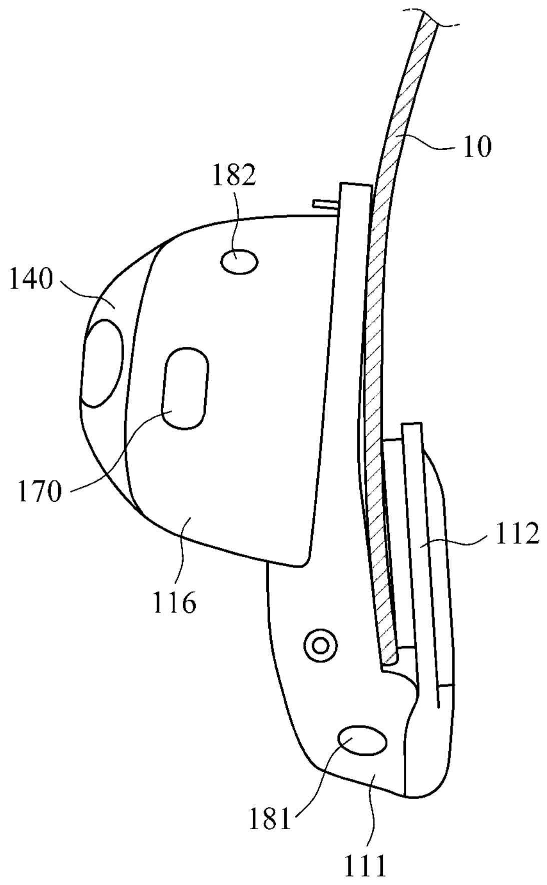
FIG. 3 is a side view illustrating an example of mounting the Bluetooth headset on a helmet.
Figure 4:
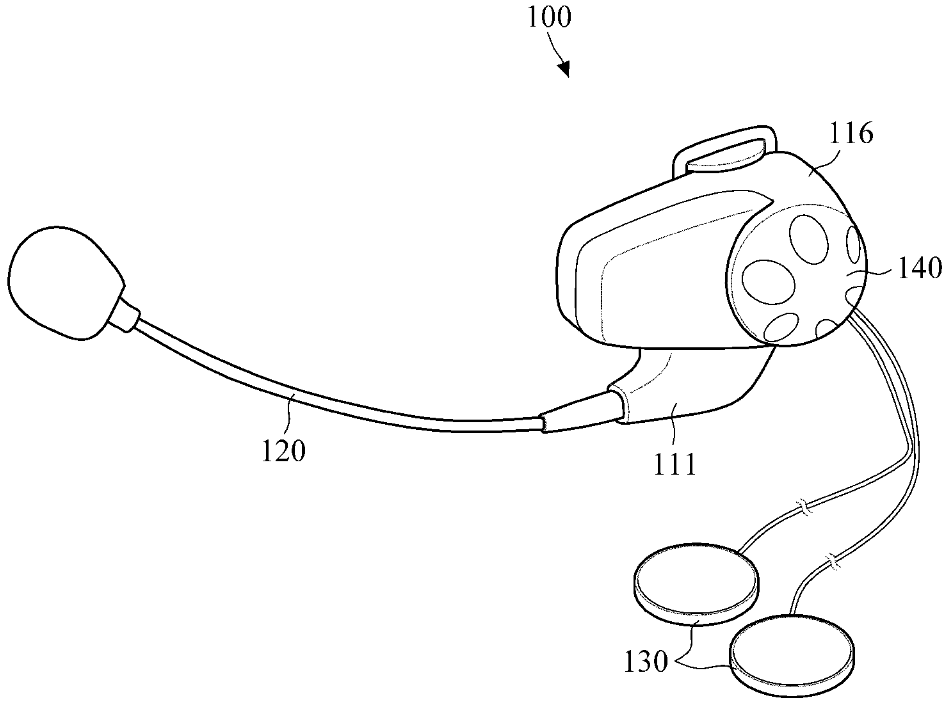
FIG. 4 is a perspective view illustrating the Bluetooth headset shown in FIG. 1.
Figure 5:
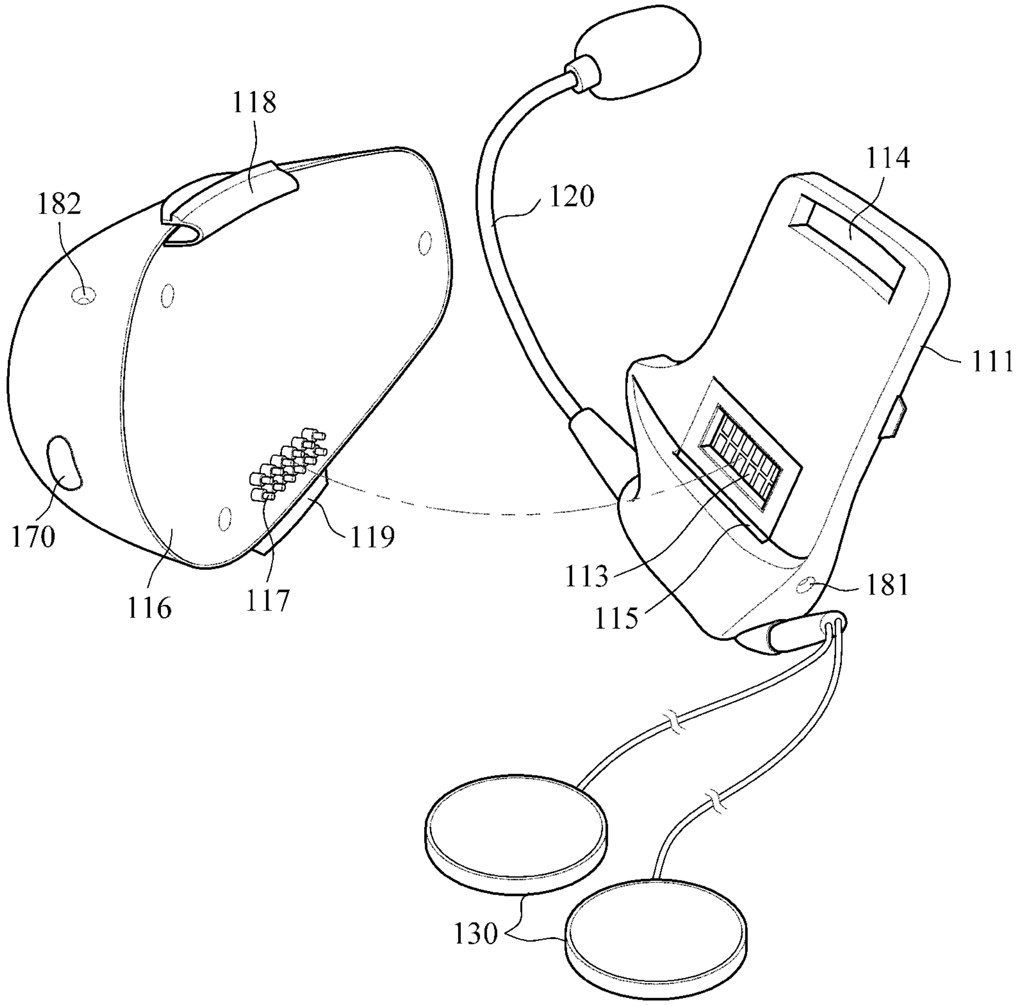
FIG. 5 is an exploded perspective view illustrating the Bluetooth headset shown in FIG. 4.

Meanwhile, the headset body 110 has a structure shown in FIGS. 3 to 5. FIG. 3 is a side view illustrating an example of mounting the Bluetooth headset on a helmet. FIG. 4 is a perspective view illustrating the Bluetooth headset shown in FIG. 1. FIG. 5 is an exploded perspective view illustrating the Bluetooth headset shown in FIG. 4.

As shown in FIGS. 3 to 5, the headset body 110 includes a clamp unit 111 and a main unit 116. The clamp unit 111 is detachably provided on the helmet 10. Accordingly, the user may attach or detach the clamp unit 111 to/from the helmet 10 when desired. The clamp unit 111 may be detachable on the helmet 10 in various forms.

As one example, the clamp unit 111 has a structure including a fixing plate 112 fixed through bolts. When the clamp unit 111 is mounted on the helmet 10, the user unfastens the bolts to loosen the fixing plate 112 with respect to the clamp unit 111. After that, an outer cell of the helmet 10 is interposed between the clamp unit 111 and the fixing plate 112, and the bolts are fastened to fix the fixing plate 112. In this manner, the clamp unit 111 is mounted on the helmet 10.

When the clamp unit 111 needs to be separated from the helmet 10, the user unfastens the bolts to loosen the fixing plate 112 from the outer cell of the helmet 10. Then, the outer cell of the helmet 10 is removed from the space between the clamp unit 111 and the fixing plate 112, thereby separating the clamp unit 111 from the helmet 10. As another example, the fixing plate 112 is completely removed from the clamp unit 112 and may use double sided adhesive tape to attach the clamp unit 112 to the helmet 10.

The microphone 120 and the speaker 130 are installed on the clamp unit 111. The microphone 120 is connected to the clamp unit 111 by a support such that the microphone 120 is positioned near the mouth of a user in a state in which the user wears the helmet 10. The speaker 130 is provided as a pair of speakers to provide a user with music in stereo.

Both sides of the pair of speakers 130 are attached to either side of the inner surface of the helmet 10 by double sided adhesive tape such that both sides of the pair of speakers 130 are placed at both ears of a user having the helmet 10 on. The speakers 130 are connected to the clamp unit 111 by cables. The clamp unit 111 may be provided with an audio input terminal 181. Accordingly, if an audio device is connected to the audio input terminal 181 through audio cables, the user may enjoy music through the cables.

The main unit 116 is mounted on the clamp unit 111. The Bluetooth module 150 and the control unit 160 are mounted inside the main unit 116. The jog dial 140 is installed at an outer side of the main unit 116. The jog dial 140 is mounted at an opposite surface to a surface of the main unit 116 having the clamp unit 111 attached thereon to perform a rotation operation and be subject to a push operation. The jog dial 140 is provided in a hemispherical shape, and is provided at a circumference of the outer surface thereof with a plurality of grooves to facilitate manipulation by a user.

A charging port 182 may be provided on the main unit 116. The charging port 182 is is used to charge power of the power supply unit 101. If a charger is connected to the charging port 182 through, for example, USB charging cables, the power supply unit 101 is charged. Although not shown, when the Bluetooth headset 100 operates abnormally, the Bluetooth headset 100 may be provided with a reset button for resetting.

The main unit 116 is detachably provided with respect to the clamp unit 111. The user may charge the main unit 116 by separating the main unit 116 from the clamp unit 111. This enhances the convenience in use of the Bluetooth headset 100. The main unit 116 may be detached/attached with respect to the clamp unit 111 in various forms.

For example, the clamp unit 111 may have a stepped portion to support a lower part of the main unit 116. The lower part of the main unit 116 has an insertion protrusion 119. The stepped portion has an insertion groove 115 into which the insertion protrusion 119 is inserted in a state in which the main unit 116 is placed on the stepped portion of the clamp unit 111.

A locking hole 114 is formed in the upper part of the clamp unit 111, and a locking hook 118, which is coupled to or separated from the locking hole 114, is formed on the upper part of the main unit 116. The locking hook 118 is elastically deformed and then restored while passing through the locking hole 114, thereby maintaining a locking state. In a state in which the locking hook 118 is locked to the locking hole 114, if a user pulls out the locking hook 118 from the locking hole 114 while pressing the locking hook 118, the locking state of the locking hook 118 is released.

Since the clamp unit 111 and the main unit 116 are separable from each other, a connection member may be provided to connect the microphone 120 and the speaker 130 to the control unit 160 of the main unit 116. For example, the main unit 116 is provided with a plug 117 and the clamp unit 111 is provided with a plug socket 113 allowing the plug 117 to be inserted thereinto and to be connected thereto.

The Bluetooth headset 100 has an intercom function. Accordingly, a driver wearing the Bluetooth headset 100 may perform wireless intercommunication with someone on the motorcycle of the driver or another driver of a motorcycle, if the person is wearing a Bluetooth headset having an intercom function.

The main unit 116 may further include a push button 170 for inputting an instruction of a user together with the jog dial 140 or without the jog dial 140. Although not shown, the main unit 116 may further include an indicator lamp to inform a user of a state according to the manipulation of the push button 170 and the jog dial 140. The push button 170 enables the Bluetooth headset 100 to provide various operations in cooperation with the jog dial 140.

For example, if the jog dial 140 and the push button 170 are simultaneously pushed, the control unit 160 turns power on or off. In this case, the time during which the jog dial 140 and the push button 170 are simultaneously pushed may be set to be different between when turning power on and off. In addition, upon turning power on, the control unit 160 may continuously turn on a blue lamp of the indicator lamp and may output an escalating beep sound. Upon turning power off, the control unit 160 may continuously turn on a red lamp of the indicator lamp and may output descending beep sound.

In a state in which the Bluetooth headset 100 is paired with the Bluetooth device 20 and the Bluetooth device 20 transmits an audio signal to the control unit 160, as the jog dial 140 is rotated, the control unit 160 may adjust the volume of sound to be output through the speaker 130. In the above state where the Bluetooth headset 100 is paired with the Bluetooth device 20, as the jog dial 140 is pressed and rotated, the control unit 160 may play an audio track on forward or backward according to the rotation direction of the jog dial 140. In this state, if the jog dial 140 is pushed, the control unit 160 may playback or stop music.

In a state in which the power of the Bluetooth headset 100 is turned on, if the push button 170 is pushed during a predetermined pairing setting time, the control unit 160 may activate the Bluetooth module 150 for pairing with one of a mobile phone, an audio device and a navigation system present around the Bluetooth headset 100. The pairing setting time may be set to about five seconds. In this case, the control unit 160 may alternately turn on the blue lamp and the red lamp, and output a high-pitched continuous beep sound through the speaker 130.

In a state in which the Bluetooth headset 100 is paired with a mobile phone, if the push button 170 is pushed longer than the pairing setting time and then pushed again, the control unit 160 may activate a voice recognition call reception function. In a state in which the voice recognition call reception function is activated, if the push button 170 is pushed longer than the pairing setting time and then the jog dial 140 is pushed, the control unit 160 may deactivate the voice recognition call reception function. The time required to activate or deactivate the voice recognition call reception function is set to about eight seconds. In this state, the control unit 160 turns off the red lamp, and outputs a medium-pitched mono beep sound through the speaker 130.

In a state in which the Bluetooth headset 100 is paired with a mobile phone, if the push button 170 is pushed shorter than the pairing setting time, the control unit 160 sets the Bluetooth headset 100 to a mobile phone dialing mode and a mobile phone answering mode. When a call is incoming, if the jog dial 140 is pushed, the control unit 160 sets the Bluetooth headset 100 to a call rejection mode. While in call, if the jog dial 140 is pushed, the control unit 160 allows call forwarding between the mobile phone and the Bluetooth headset 100. In the call forwarding, the control unit 160 may output a high-pitched short beep sound or a high-pitched long beep sound through the speaker 130.

In a state in which the Bluetooth headset 100 is set to power-on, if the jog dial 140 is pushed for the pairing setting time, the control unit 160 may set the Bluetooth module 150 to a pairing mode for pairing with an adjacent Bluetooth headset. The pairing setting time may be set to about five seconds. In this case, the control unit 160 may flicker the red lamp and output a dual tone beep through the speaker 130.

In a state in which the Bluetooth headset 100 is paired with another Bluetooth headset for inter-communication, if the jog dial 140 is pushed longer than the pairing setting time and pushed again, the control unit 160 may activate a voice recognition intercom function. In a state in which the intercom function is activated, if the jog dial 140 is pushed longer than the pairing setting timing and then the push button 170 is pushed, the control unit 160 may deactivate the voice recognition intercom function. The time required to activate or deactivate the voice recognition intercom function may be set to about eight seconds. In this case, the control unit 160 may continuously turn on the red lamp and output a medium-pitched mono beep sound through the speaker 130.

In a state in which the Bluetooth headset 100 is paired with another Bluetooth headset for an intercommunication, if the jog dial 140 is pushed shorter than the pairing setting time, the control unit 160 sets the Bluetooth headset 100 to an intercom call start mode or call end mode.

In a state in which the push button 170 is pushed longer than the time required to set a voice recognition call reception function and the jog dial 140 is pushed within a predetermined setting time, the control unit 160 initializes the Bluetooth headset 100. The initializing corresponds to a state of the Bluetooth headset sent from a manufacturer. For example, if the push button 170 is pushed for twelve seconds, the control unit 160 continuously turns on the red lamp and outputs a high pitched two tone beep sound through the speaker 130. In this case, if the jog dial 140 is pushed within five seconds, the Bluetooth headset 100 is initialized, and if not, the initialization is canceled and enters a standby state.

Although an exemplary embodiment of the present invention has been described for illustrative purposes, those skilled in the art will appreciate that various modifications, additions and substitutions are possible, without departing from the scope and spirit of the invention as is disclosed in the accompanying claims.

What is claimed is:

1. A Bluetooth headset for a helmet having an inter-communication, the Bluetooth headset comprising:
   - a headset body configured to be mounted on a helmet;
   - a microphone and a speaker installed on the headset body;
   - a jog dial provided on the headset body to be mounted on a lateral exterior surface of a helmet and configured to perform a rotation operation and be subjected to a push operation in a direction perpendicular to the lateral exterior surface;
   - a Bluetooth module configured to be accommodated in the headset body and to perform wireless communication while paired with an external Bluetooth device; and a control unit configured to be accommodated in the headset body to process a signal input from the microphone, a signal input according to the rotation operation and the push operation of the jog dial and a signal received from the Bluetooth module and output the processed signal to the speaker and the Bluetooth module, wherein in response to the Bluetooth headset being paired with another Bluetooth headset for inter-communication and the jog dial being pushed for longer than a pairing setting time and then pushed again, the control unit activates a voice recognition intercom function.

2. The Bluetooth headset of claim 1, wherein the headset body comprises:

a clamp unit configured to be detachably provided on the helmet and have the microphone and the speaker installed thereon; and a main unit configured to be mounted on the clamp unit, have the jog dial provided at an outer side thereof and accommodate the Bluetooth module and the control unit.

3. The Bluetooth headset of claim 2, wherein the main unit is provided with a push button for inputting an instruction of a user together with the jog dial or without the jog dial.

4. The Bluetooth headset of claim 2, wherein the main unit is provided with a charging port and the clamp unit is provided with an audio input terminal.

5. The Bluetooth headset of claim 2, wherein the main unit is detachably provided with respect to the clamp unit.

6. The Bluetooth headset of claim 1, further comprising a clamp unit configured to detachably attach to a lower rim of the helmet, wherein the jog dial protrudes from the headset body such that when the clamp unit is attached to the lower rim of the helmet, the jog dial extends upward to an exterior side surface of the helmet from the lower rim of the helmet.

* * * * *